J. M. RAIKY.
DIRIGIBLE AUTOMOBILE LIGHT SUPPORT.
APPLICATION FILED OCT. 14, 1912.
1,055,225.
Patented Mar. 4, 1913.
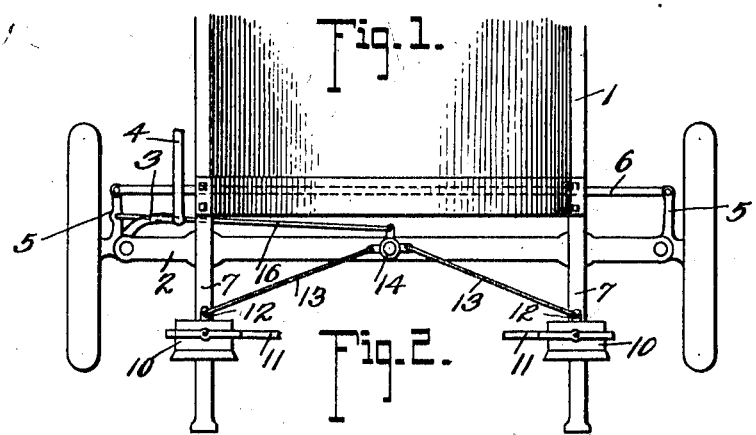
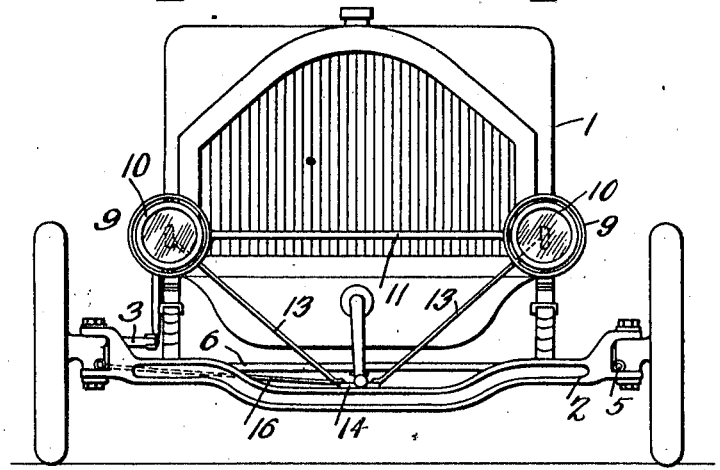
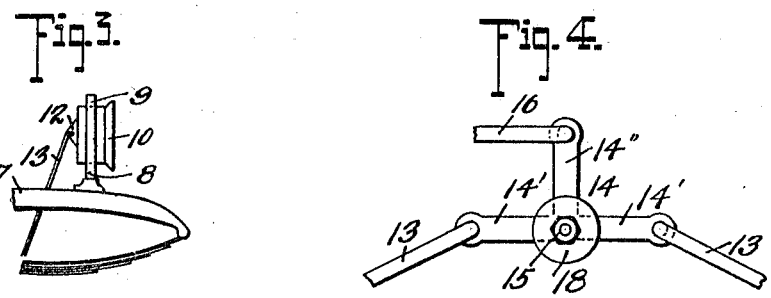
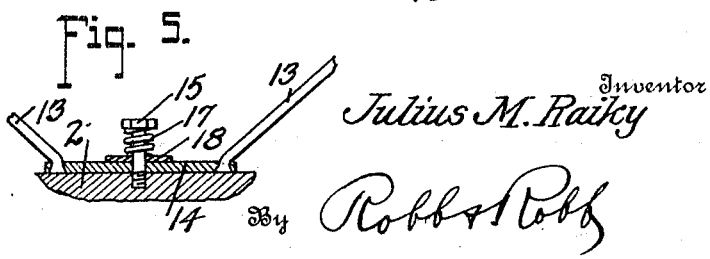
Witnesses
Inventor
Julius M. Raiky
By Robb & Robb
Attorneys

UNITED STATES PATENT OFFICE.

JULIUS MARION RAIKY, OF COFFEEVILLE, MISSISSIPPI, ASSIGNOR OF ONE-HALF TO C. K. BAILEY, OF COFFEEVILLE, MISSISSIPPI.

DIRIGIBLE AUTOMOBILE LIGHT-SUPPORT.

1,055,225. Specification of Letters Patent. Patented Mar. 4, 1913.

Application filed October 14, 1912. Serial No. 725,573.

*To all whom it may concern:*

Be it known that I, JULIUS MARION RAIKY, a citizen of Hungary, residing at Coffeeville, in the county of Yalobusha and State of Mississippi, have invented certain new and useful Improvements in Dirigible Automobile Light-Supports, of which the following is a specification.

This invention relates to improvements in dirigible automobile light supports, the object in view being to provide a simple construction for automatically shifting the headlights of an automobile in rounding curves so that the rays of said light will be directed to illuminate the corresponding course of the vehicle.

The simplicity of the mechanism employed in my invention permits of its adaptability to the ordinary styles of motor vehicles in an obvious manner.

With the above and other objects in view, this invention consists of the construction, combination and arrangement of parts, all as hereinafter more fully described, claimed and illustrated in the accompanying drawings, wherein:—

Figure 1 is a top plan view of the forward portion of an automobile having my improvements applied thereto. Fig. 2 is a front elevation. Fig. 3 is a partial view in side elevation showing the connection to a headlight. Fig. 4 is a detail view showing more clearly the lever for operating the lamps, and Fig. 5 is a partial sectional view showing a preferred manner of securing the operating lever to the axle so as to take up any wear of the parts.

Throughout the following detail description, and on the several figures of the drawings, similar parts are referred to by like reference characters.

Referring now to the drawings and specifically describing the invention, 1 designates the forward portion of an automobile and 2 the front axle of the same, the usual steering spindle 3 being provided and having the steering gear connecting link 4 connected therewith.

At 5 is shown the customary steering arm secured at each side of the machine and connected by means of the cross rod 6.

At the usual place on the outer portion of the side frame members 7 of the automobile are secured lamp standards 8 formed with a suitably shaped bracket 9 in which is pivotally mounted at each side a headlight 10, said brackets or frames 9 being preferably connected by means of a brace rod 11, as shown most clearly in Fig. 2 of the drawings. From the rear of each lamp 10 projects a member 12 substantially of triangular shape to which is secured a connecting rod 13, it being understood that a similar rod is connected with the other lamp. These rods 13 at their opposite ends are connected to the laterally extending arms 14' of the three-arm lever 14, which lever is pivotally mounted by means of a bolt 15 on the central portion of the front axle 2 of the automobile. The rearwardly extending arm 14" of the lever 14 has connected thereto the lamp shifting rod 16 which in turn is connected at its opposite end to the steering arm 5 in any suitable manner.

It will be obvious from the foregoing description that as the wheels are turned by the steering mechanism, motion will be transmitted through the lamp shifting rod 16 to the lever 14 by means of which the lamps 10 through the connecting rods 13 will be turned in the corresponding direction. In this way the rays of the lights will follow the course of the vehicle so that at all times its path is illuminated in a desirable manner.

In order that any wear on the lever 14 due to the vibration of the machine may be suitably provided for, I preferably interpose a spring 17 between the head of the bolt 15 and a washer 18, the latter resting directly upon the lever 14. As will be obvious, other means may be provided for serving this particular function, and that which I have shown may readily be modified without departing from the spirit of my invention.

Having thus described the invention, what is claimed is:

Lamp operating mechanism for vehicles comprising in combination, steering mechanism for said vehicle, a lever pivotally mounted upon the axle of the vehicle aforesaid and consisting of a pair of laterally extending arms and a third rearwardly extending arm, a lamp shifting bar connected with the steering mechanism aforesaid and the rearwardly extending lever arm, lamps pivotally mounted upon the frame of said vehicle, and rods connected with said lamps and the lateral arms of the lever aforesaid.

In testimony whereof I affix my signature in presence of two witnesses.

JULIUS MARION RAIKY.

Witnesses:
J. W. RENSHAW,
L. T. WISDOM.